(12) United States Patent
Hernandez-Marti et al.

(10) Patent No.: US 7,009,312 B2
(45) Date of Patent: Mar. 7, 2006

(54) VERSATILE MODULAR PROGRAMMABLE POWER SYSTEM FOR WIRELINE LOGGING

(75) Inventors: Ramon Hernandez-Marti, Austin, TX (US); Gilbert R. Martinez, Georgetown, TX (US); Terry L. Mayhugh, Round Rock, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 153 days.

(21) Appl. No.: 10/808,933

(22) Filed: Mar. 25, 2004

(65) Prior Publication Data

US 2005/0190584 A1 Sep. 1, 2005

Related U.S. Application Data

(60) Provisional application No. 60/549,013, filed on Mar. 1, 2004.

(51) Int. Cl.
*H02J 1/00* (2006.01)
(52) U.S. Cl. .................... 307/34; 340/855.9
(58) Field of Classification Search ............ 340/854.9, 340/853.3, 855.8, 855.9; 307/31, 32, 33, 307/34, 149, 151, 53
See application file for complete search history.

(56) References Cited

U.S. PATENT DOCUMENTS

| | | | |
|---|---|---|---|
| 5,925,278 A * | 7/1999 | Hirst | ................ 219/662 |
| 6,297,455 B1 | 10/2001 | Wijnberg et al. | |
| 6,469,636 B1 | 10/2002 | Baird et al. | |
| 6,522,119 B1 | 2/2003 | Hernandez | |
| 6,552,665 B1 | 4/2003 | Miyamae et al. | |
| 2003/0098673 A1 | 5/2003 | Hernandez | |

* cited by examiner

*Primary Examiner*—Shawn Riley
(74) *Attorney, Agent, or Firm*—Schlumberger Conveyance and Delivery

(57) ABSTRACT

A method and system for providing power to a wireline logging system includes a rectifier section operable to receive an AC input signal and generate a first DC power signal as an output. A converter section cascadedly coupled to the rectifier section converts the first DC power signal to a second DC power signal. An inverter section cascadedly coupled to the converter section is operable to generate an output power signal providing power to a system in response to receiving the second DC power signal. A control section is coupled to the rectifier section, the converter section, the inverter section and a communications link. The communications link is operable to receive information describing waveforms for the output power signal. The control section is operable to receive the information and control a corresponding section to generate the waveforms in response to receiving the information.

38 Claims, 7 Drawing Sheets

VERSATILE MODULAR PROGRAMMABLE POWER SYSTEM FOR WIRELINE LOGGING

CROSS-REFERENCE TO RELATED APPLICATIONS

Applicants hereby claim the benefit of U.S. Provisional Application Ser. No. 60/549,013 filed Mar. 1, 2004 and entitled "VERSATILE MODULAR PROGRAMMABLE POWER SYSTEM FOR WIRELINE", which provisional application is incorporated herein for all purposes.

BACKGROUND OF THE INVENTION

1. Field of the Invention

The present invention relates to wireline logging systems for subsurface resource drilling, and more particularly relates to providing power for wireline logging.

2. Related Art

The exploration for subsurface resources such as hydrocarbons including oil and gas, minerals and water, typically requires various techniques for determining the characteristics of geological formations. Many characteristics, such as the hydrocarbon volume, resistivity, porosity, lithology, and permeability of a formation, may be deduced from certain measurable quantities associated with the geological formations. It is a well-known technique to measure these characteristics by drilling a well in conjunction with a wireline logging system.

Wireline logging generally refers to the surveying and operation of wells by using various tools and electronic measuring instruments conveyed into a wellbore with an armored steel cable, commonly referred to as a wireline cable. Wireline logging systems generally refers to the tools and techniques utilized in the surveying and operation of wells. Various aspects of the wireline logging systems are described in the following U.S. Patents, which are incorporated herein by reference: Telemetry System For Borehole Logging Tools (U.S. Pat. No. 6,552,665), Power Source Regulator For Wireline Cable System (U.S. Pat. No. 6,522,119), and Wireline Cable (U.S. Pat. No. 6,297,455).

Measurements are made by downhole instruments, which are secured to the wireline cable. The measurements are transmitted from the instruments to a computer system located at the surface through multiple electrical conductors included within the wireline cable. Various wireline logging tools based on electrical, acoustical, nuclear, magnetic and imaging technologies are used to stimulate the geological formations and/or fluids within the wellbore and the electronic measuring instruments then measure the response of the geological formations and/or fluids. In addition to providing structural support for conveying the tools and measuring instruments into the wellbore, and for communicating the measurements to the surface based logging devices, the wireline cable is also used to provide electrical power to these various logging tools and measuring instruments.

The power requirements for the individual logging tools and measuring instruments may vary from a few watts to about 3 kilowatts. The specific types of voltage and/or current signals (or waveforms) used to provide the power may vary from direct current (DC) to alternating current (AC). The DC voltage signal may vary from 0 Volts to 2,000 Volts. The AC voltage signal may vary from 0 to 1,100 Volts. The AC current signal may vary from 0 Amperes (Amps) to 10 Amps$_{RMS}$. Depending on the number and types of logging tools and measurement devices used, the cumulative power requirement may vary from 500 Watts to about 10 kilowatts.

Traditionally, the above described power signals are generated by a variety of disparate tools and techniques depending on the nature of the output required, as described in FIG. 1. For example, an AC input power 110 may be derived from the power utility network or from an on-board electrical generator set. The AC input power 110 may be single phase or 3 phase. A fixed or adjustable transformer 120 (the adjustable or variable transformer is also referred to as a variac) may be used to change the output voltage. The output frequency, however, remains the same as the input frequency. Transformers may be used to multiplex power circuits by tapping the center of the secondary. Automatic control may be achieved by connecting a stepper motor to the variac axis of a transformer 130.

A high power DC generator 112 may include the above fixed and variable transformer combination in association with a rectifier and filter (not shown). The high power DC generator 112 may be used to generate a DC current signal 105, although more modern systems take advantage of switching programmable converters. For example, the following U.S. patent describes various aspects of using programmable switching power supplies and is incorporated herein by reference: High-Power Well Logging Method And Apparatus (U.S. Pat. No. 6,469,636). A waveform generator 115 may be used to obtain a very low frequency current signal 125 required for geological measurements. A motor-generator set 135 may be used to generate a 120 Hertz AC power signal 145, which may be required in some wireline logging systems.

Currently, a traditional wireline logging system may include a number of the above-described types of generators with each type of generator providing a particular type of output signal. A traditional power supply system, which provides power to the tools and instruments through a logging cable 150, is configured by assembling various types of disparate individual generators. The armor cable 152, which is included in the logging cable 150 provides structural support and is used as a ground. The specific size and type of generator selected is based on power requirements defined by the particular tools and instruments (not shown) used for wireline logging. The generators may be connected between themselves and to a power distribution system 160. The power distribution system delivers the power to the tools and instruments through multiple conductors 155 included in the wireline cable 150. The traditional approach to providing power thus results in cumbersome and bulky power supply systems having different types of power sources to manage and maintain. Spare parts requirement to stock the disparate types of generators increase asset costs. Designing for redundancy to accommodate failures further adds to the costs and size.

It should therefore be appreciated that a need exists to provide a power supply module included in a wireline logging system, in which the power supply module is operable to generate AC or DC power having customized voltage and current waveforms. Furthermore, it would be desirable to build complex power supply systems for wireline logging using the power supply module as a basic building block. For example, it would be desirable to build a power supply system having a modular architecture from a plurality of the power supply modules such that the power supply system is scalable to match the power, voltage, current, cost, spare parts, and reliability requirements of the wireline logging system application.

SUMMARY

The foregoing need is addressed by the present invention. According to one form of the invention, a method and system for providing power to a wireline logging system includes a rectifier section operable to receive an alternating current (AC) input signal and generate a first direct current (DC) power signal as an output. A converter section cascadedly coupled to the rectifier section converts the first DC power signal to a second DC power signal thereby causing the second DC power signal to be floated with respect to the first DC power signal and a ground. An inverter section cascadedly coupled to the converter section is operable to generate an output power signal providing power to a load in response to receiving the second DC power signal. A control section is coupled to the rectifier section, the converter section, the inverter section and a communications link. The communications link is operable to receive information describing waveforms for the output power signal. The control section is operable to receive the information and control a corresponding section to generate the waveforms in response to receiving the information.

In one aspect of the present invention, a method for providing power to a wireline logging system includes receiving an alternating current (AC) input signal to generate a first direct current (DC) power signal. The first DC power signal is generated by a rectifier section responsive to the receiving of the AC input signal. The first DC power signal is transferred to a converter section cascadedly coupled to the rectifier section. The first DC power signal is converted to a second DC power signal thereby causing the second DC power signal to be floated with respect to the first DC power signal and a ground. The second DC power signal is converted from the first DC power signal by the converter section. The second DC power signal is transferred to an inverter section cascadedly coupled to the converter section. The inverter section generates an output power signal responsive to receiving the second DC power signal. A control section is operable to receive information describing waveforms for the output power signal, and direct the rectifier section, the converter section and the inverter section to generate the waveforms.

Other forms, as well as additional aspects, objects and advantages of the invention will become apparent upon reading the following detailed description and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

In the following detailed description of the preferred embodiments, reference is made to the accompanying drawings illustrating embodiments in which the invention may be practiced. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

Figure 1:
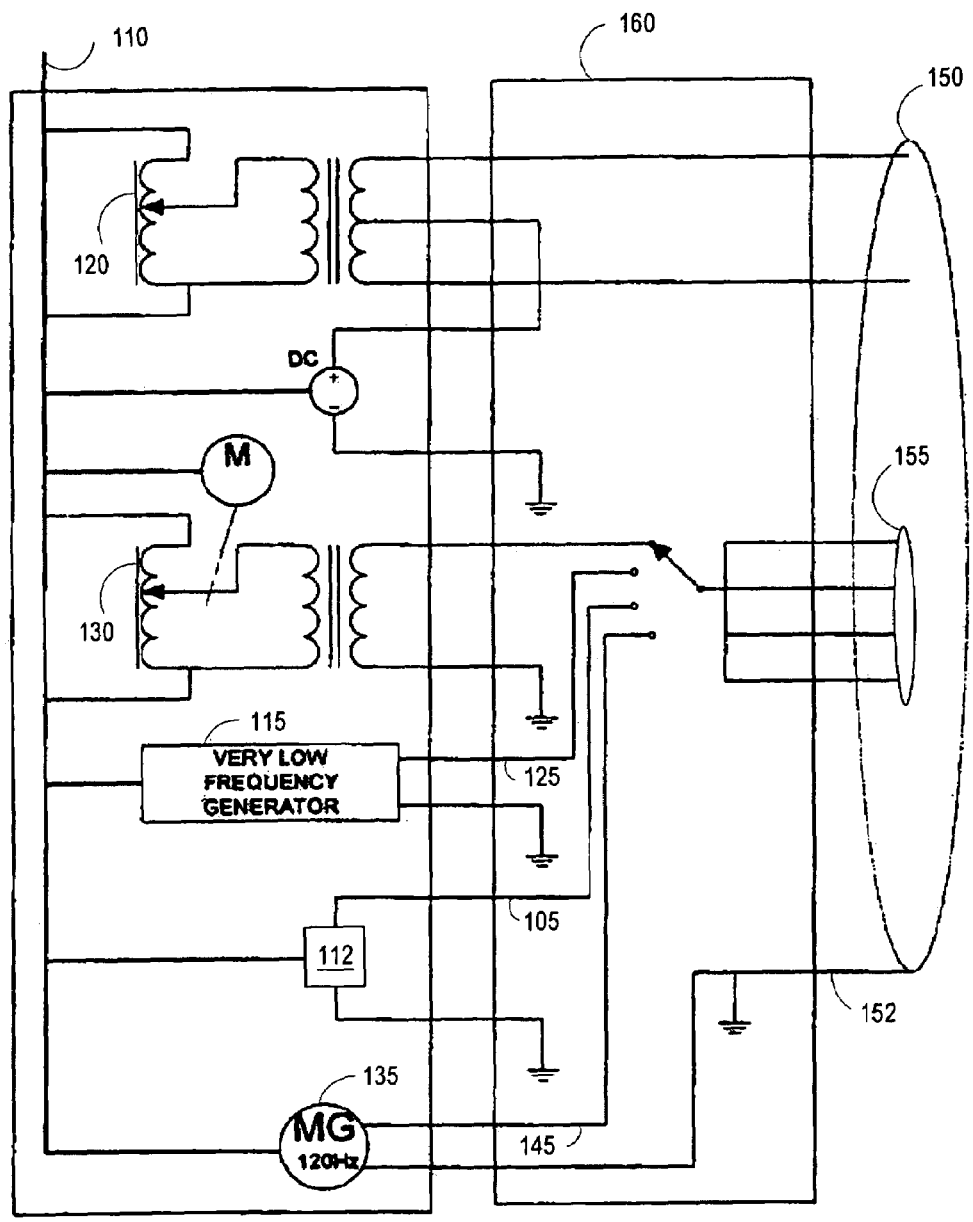
FIG. 1 described above, is a block diagram illustrating a traditional power supply system for wireline logging, according to the prior art.
Figure 2:
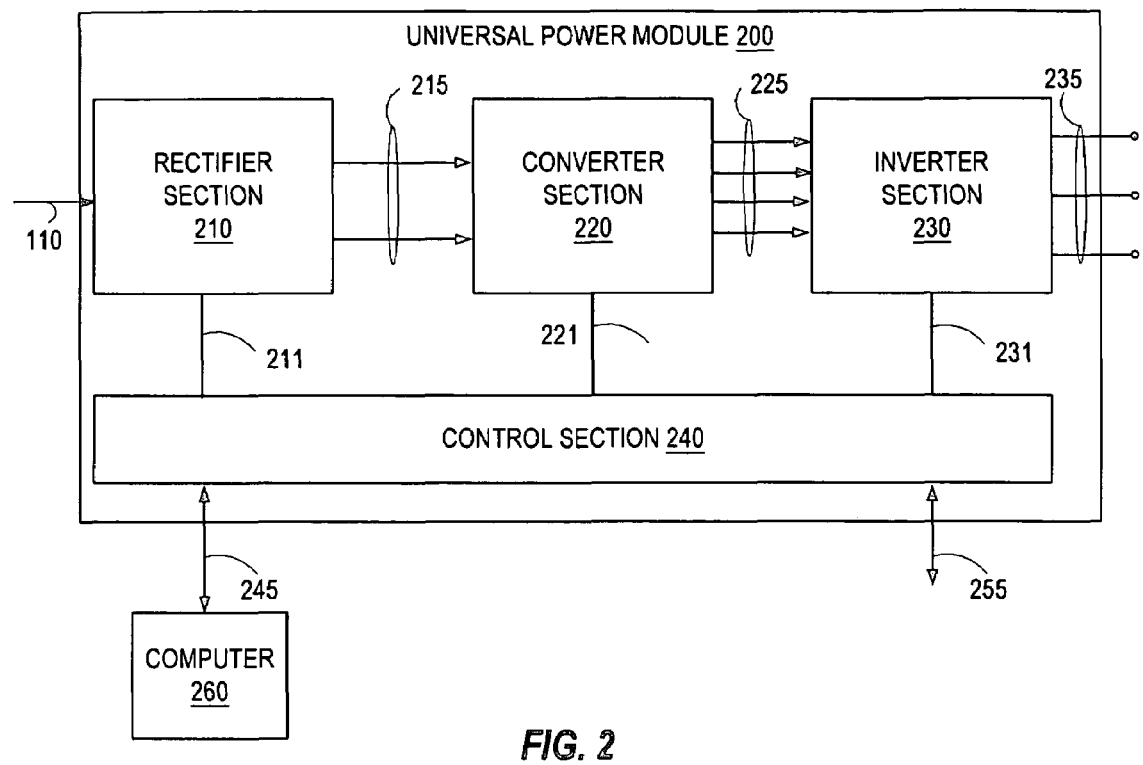
FIG. 2 illustrates a block diagram of selected elements of a universal power module, according to one embodiment of the invention.

FIG. 2 is a block diagram of selected elements of a universal power module 200 according to one embodiment of the invention. In the depicted embodiment, the universal power module 200 includes:

a) a rectifier section 210 operable to receive the AC power signal 110 and generate a first direct current (DC) power signal 215 as an output;

b) a converter section 220 cascadedly coupled to the rectifier section 210. The converter section 220 is operable to receive the first DC power signal 215 and convert the first DC power signal 215 to a second DC power signal 225 that is floating with respect to the input signal 215 and ground;

c) an inverter section 230 cascadedly coupled to the converter section 220. The inverter section 230 is operable to generate an output power signal 235 in response to receiving the second DC power signal 225. The output power signal 235 provides power to at least one logging device (not shown) included in the wireline logging system; and d) a control section 240 coupled to: d1) the rectifier section 210 by a control signal 211, d2) the converter section 220 by a control signal 221, d3) the inverter section 230 by a control signal 231, and d4) a communications link 245 with a control computer 260. The control signals 211, 221 and 231 may be implemented by several physical connections each.

Figure 3:
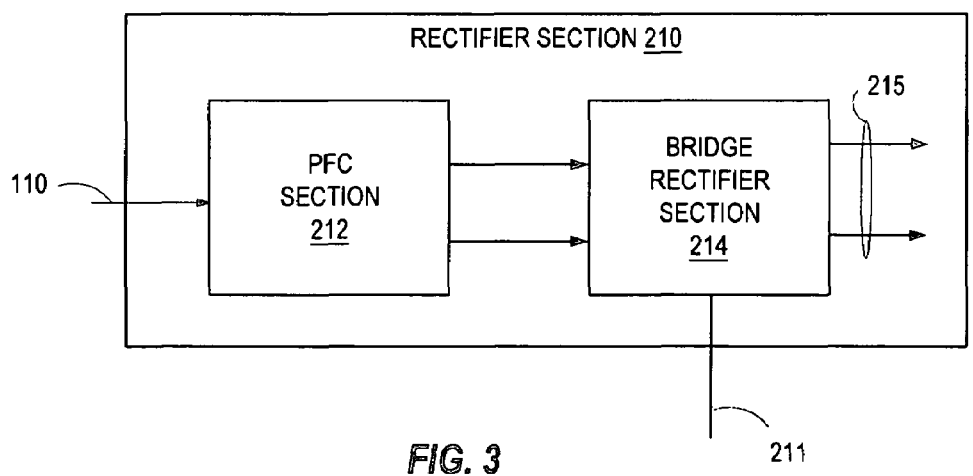
FIG. 3 illustrates selected components of selected elements of a rectifier section, according to one embodiment of the invention.
Figure 4:
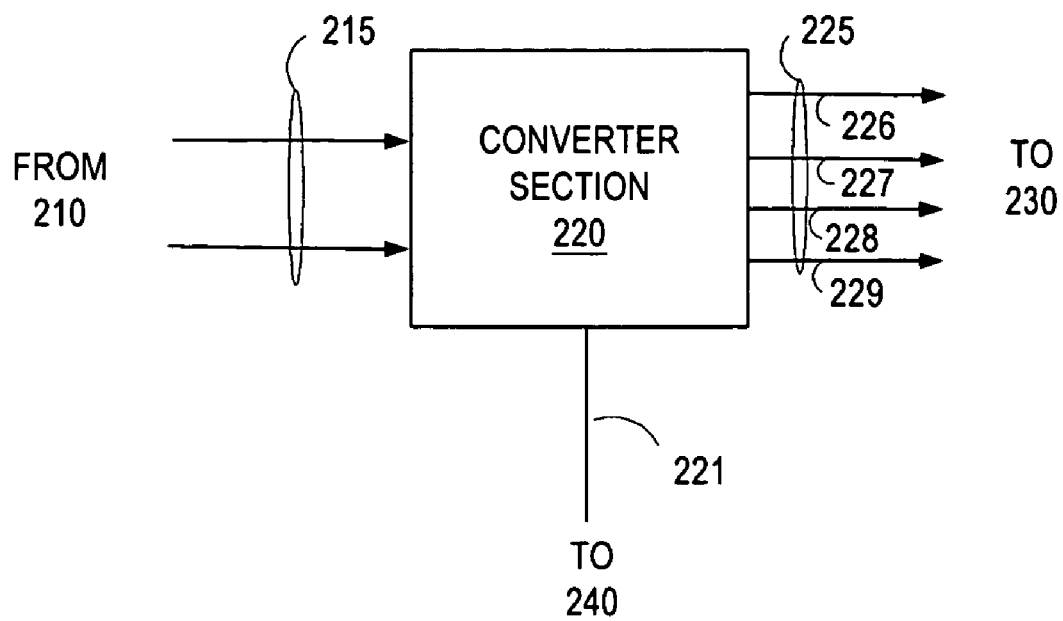
FIG. 4 illustrates selected components of selected elements of a converter section, according to one embodiment of the invention.
Figure 5:
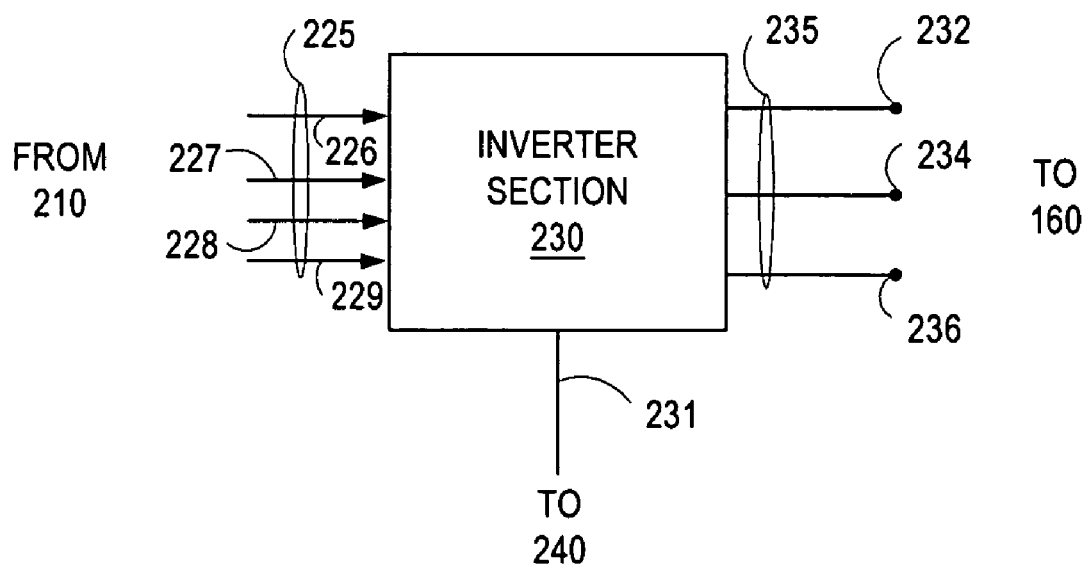
FIG. 5 illustrates selected components of selected elements of an inverter section, according to one embodiment of the invention.

Further detail of the rectifier section 210, the converter section 220 and the inverter section 230 are described in FIGS. 3, 4 and 5 respectively.

In one embodiment, the communications link 245 is operable to receive information from a computer system 260. The computer system 260 is included in the surface based wireline logging devices (not shown). The computer system 260 may be used to estimate the power, voltage, current and frequency requirement for the particular set of logging tools and measurement devices deployed. For example, in one application the power requirements may include 500 watts of AC power at 110 VAC and 50 Hertz frequency, 1000 watts of AC power at 110 VAC and 120 Hertz frequency, and 5000 watts of DC power at 50 VDC. At least one universal power module 200 is dedicated to generate each type of power required. For example, in the above example, at least 3 substantially identical units of universal power module 200 are required to match the type of power required.

Each of the universal power module 200 is capable of generating a finite amount of power, e.g., 1000 watts of DC power at 50 VDC. In the above example, 5 additional units of the universal power module 200 are required to be coupled in a power sharing arrangement to generate the required 5000 watts of DC power at 50 VDC. In other embodiments, which use a plurality of the universal power module 200, the control section 240 includes a control link 255 to co-ordinate operation of other universal power modules included in the power sharing arrangement. Further detail of the power sharing arrangement for coupling multiple universal power modules is described in FIG. 7.

For generating each type of power, specific input and output values for voltage and current waveforms are defined. For example, information describing characteristics of the voltage and current waveform may include definitions for amplitude, frequency and duty cycle.

In one embodiment, the control section 240 is operable to receive the information that is generated by a software program (not shown) of the control computer 260 and transferred through the communications link 245. In response to receiving the information, the control section 240 is operable to direct or control a corresponding section via control signals 211, 221 and 231 respectively to generate the required waveforms. For example, in one embodiment the universal power module 200 is required to generate 1000 watts at 500 VDC. In this embodiment, the control section 240 directs the rectifier section 210 to generate the first DC power signal 215 having a 400 VDC value and a DC current signal (not shown) having 2.5 Amps in response to receiving the AC power input signal 110. The control section 240 also directs the converter section 220 to generate a floating output voltage of 500 VDC and a DC current signal (not shown) having 2.0 Amps. The inverter section 230 is used as a static switch in order to not change or modify the first DC power signal 215. In this embodiment, the second DC power signal 225 and the output power signal 235 are substantially the same.

In another embodiment, the universal power module 200 described above is required to generate an output voltage having a reverse polarity. In this embodiment, the control section 240 directs the inverter section 230 to generate the output power signal 235, which is substantially the same as the first DC power signal 225 but with a reverse polarity.

If an AC output signal is required, the control section 240 directs the converter section 220 to generate a DC voltage equal to the AC signal peak amplitude and the inverter section 230 to generate the output power signal 235 having the required AC signal voltage and frequency characteristics.

FIG. 3 is a block diagram of selected elements of the rectifier section 210 according to one embodiment of the invention. In the depicted embodiment, the rectifier section 210 includes:

a) an optional power factor correction (PFC) section 212 is included to adjust, if required, a power factor of the AC input power 110. The AC input power 110 may conform to at least one of US, European or other worldwide power distribution standards published by The International Electrotechnical Commission (IEC). In one embodiment, the PFC section 212 is implemented using passive components such as inductors and capacitors. In one embodiment, the PFC section 212 is implemented using active components such as field effect transistor (FET) switches in combination with passive components. If utilized, the PFC with active components is typically placed after a bridge rectifier section 214 described below, unlike the case of a passive PFC, which is generally placed before the bridge rectifier section 214.

b) the bridge rectifier section 214 cascadedly coupled to the PFC section 212. The bridge rectifier section 214 is operable to receive the AC power signal 110 and generate the first direct current (DC) power signal 215 as an output. In one embodiment, the bridge rectifier section 214 may be implemented using a traditional bridge rectifier circuit. In one embodiment, the bridge rectifier section 214 may be adapted to receive the AC input signal 110, which conforms to at least one power distribution standard published by the IEC. The bridge rectifier section 214 is operable to receive the control signal 211 from the control section 240 and adjust a duty cycle of the rectified waveform to generate the required characteristics of the first direct current (DC) power signal 215 such as regulated voltage level and acceptable switching noise or voltage ripple.

The use of 3 phase versus 1 phase AC input power 110 may be application dependent. For lower power requirements, e.g., typically less than 5000 watts, it may be preferable to use the AC input power 110 signal having a single phase. For higher power requirements, e.g., 5000 watts or higher, it may be preferable to use the AC input power 110 signal having 3 phases. Additionally, use of a 3 phase input signal generally results in reducing the ripple content of the first DC power signal 215. Alternatively, the inputs of several modules 200 connected to power concurrently the same circuit can be distributed over the three phases to spread the load. This does not reduce the ripple content but allows powering large loads with modules 200 that remain operable from single phase distribution circuits.

FIG. 4 is a block diagram of selected elements of the converter section 220 according to one embodiment of the invention. In the depicted embodiment, the converter section 220 is operable to receive the first DC power signal 215 and convert the first DC power signal 215 to a second DC power signal 225, floating with respect to the first DC power signal 215 and from ground. The converter section 220 is operable to step up, step down or maintain the voltage level of the input and output signal in response to receiving one or more control signals 221 from the control section 240. That is, the voltage levels of the first and second DC power signals 215 and 225 may be different or in some cases may be the same. In one embodiment, the converter section 220 uses a switching circuit (not shown) to convert to an AC signal, followed by a transformer (FIG. 6) to achieve galvanic isolation.

In the depicted embodiment, the converter section 220 provides 4 floating output terminal pairs 226, 227, 228 and 229. Further detail of the universal power section 220 is described in FIG. 6.

FIG. 5 is a block diagram of selected elements of the inverter section 230 according to one embodiment of the invention. In the depicted embodiment, the inverter section 230 is operable to receive and convert the second DC power signal 225 to the output power signal 235. The output power signal 235 may have a predefined arbitrary waveform such as a DC, sinusoid or a pulse signal. In one embodiment, the output power signal 235 may be selected from a) the second DC power signal 215, b) the second DC power signal 225 having a reverse polarity, or c) an AC output signal (not shown) having a predefined amplitude and frequency.

In one embodiment, the inverter section 230 includes a first output terminal 232, a second output terminal 234 and a third output terminal 236 for electrically coupling the output power signal 235 to at least one logging device (not shown). The first and third output terminals 232 and 236 provide a floating point output and the second output terminal 234 provides a center tap. The center tap may be advantageously used to inject common mode signals to the circuit powered by terminals 232 and 236. Further detail of the universal power section 220 to boost the voltage signal is described in FIG. 6.

Figure 6:
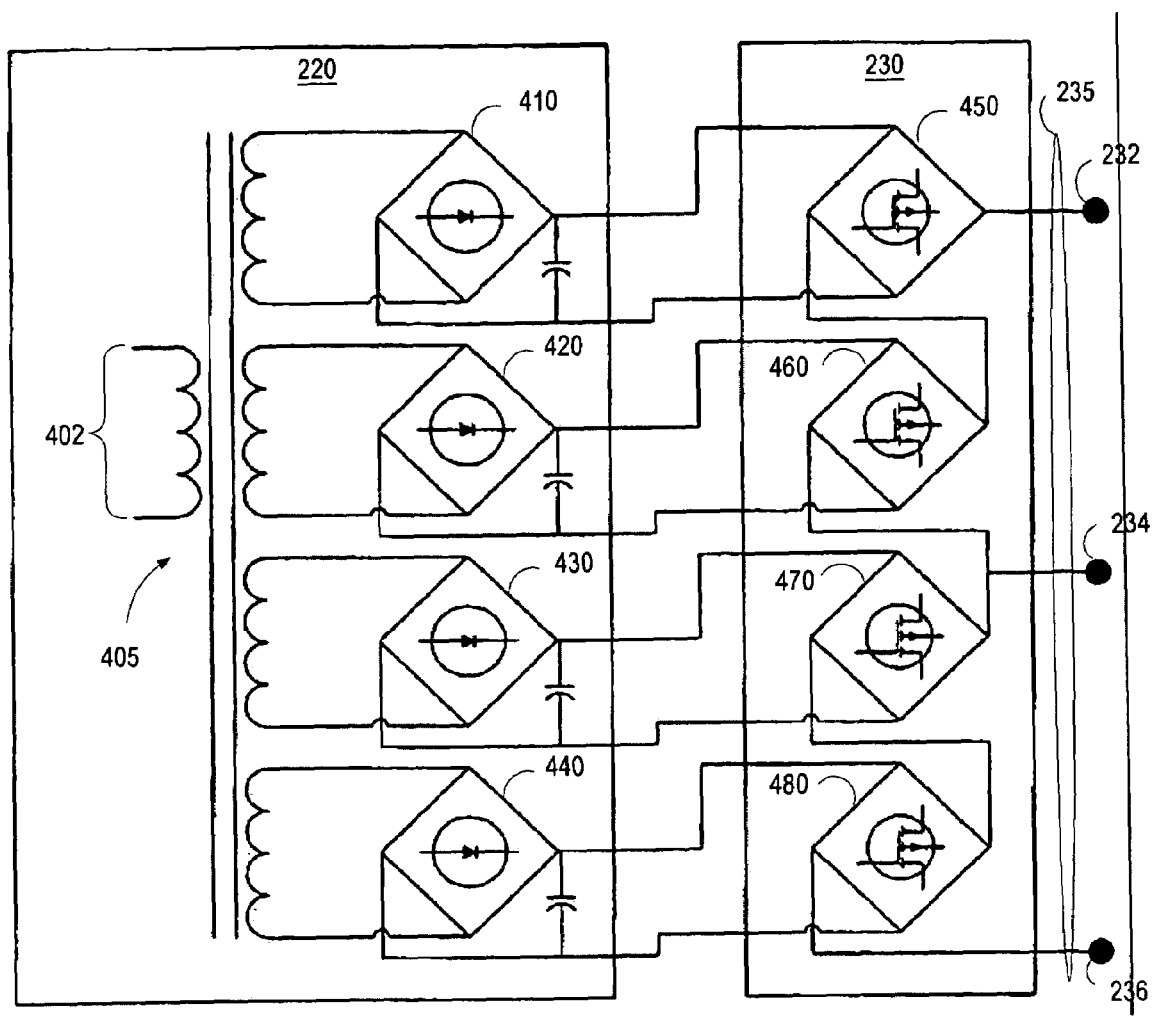
FIG. 6 is a block diagram of the converter section of FIG. 4 and the inverter section of FIG. 5 coupled to boost an output power signal, according to one embodiment of the invention.

FIG. 6 is a block diagram of the converter section 220 and the inverter section 230 coupled to boost the output power signal 235, according to one embodiment of the invention. Traditional power supplies using active components such as FET switches may not be able to generate higher voltage signals beyond a 600 Volt maximum. Many legacy wireline logging systems include logging tools, which require voltages as high as 2000 VDC or 1500 VAC. Floating secondaries may be advantageously connected in series thereby boosting the output voltage.

In the depicted embodiment, the converter section 220 includes 4 rectifier bridges 410, 420, 430 and 440 located on the secondary side of an isolation transformer 405. As described earlier, the isolation transformer 405 is also included to provide galvanic isolation to the converter section 220, allowing the injection of common mode voltages through the center tap 234. The first DC power signal 215 is converted to an AC signal 402 by a switching circuit (not shown). The AC signal 402 is provided to a primary side of the transformer 405. The rectifier bridges 410, 420 and 430, 440 are located on each side of the center tap of the transformer 405. The outputs of the rectifier bridges 410, 420, 430, and 440 are combined with the inverter section 230 to advantageously boost the output voltage and provide short circuit protection.

In the depicted embodiment, the inverter section 230 includes 4 switching bridges 450, 460, 470 and 480. The switching bridges 450, 460 and 470, 480 are located on each side of the center tap, e.g., the second output terminal 234, of the inverter section 230. The switching bridges 450 and 460 are connected in series between the first output terminal 232 and the second output terminal 234. Similarly, the bridges 470 and 480 are connected in series between the third output terminal 236 and the second output terminal 234. At least two switching bridges located on each side of the center tap are preferred in order to reduce the occurrence of the output terminals to be shorted when any one of the switching bridges fails.

In one embodiment, by controlling the phase of the switching bridges 450, 460, 470 and 480 located on either side of the center tap allows changing the output power signal 235 from full AC voltage and current to half AC voltage and twice the AC current, when coupled in parallel to the center tap. When the output power signal 235 is DC, this feature advantageously allows selecting the polarity of the output terminals.

In another embodiment, one transformer and input switching circuit supply bridges 410 and 420 while a second transformer and input bridge circuit supply bridges 430 and 440.

Figure 7:
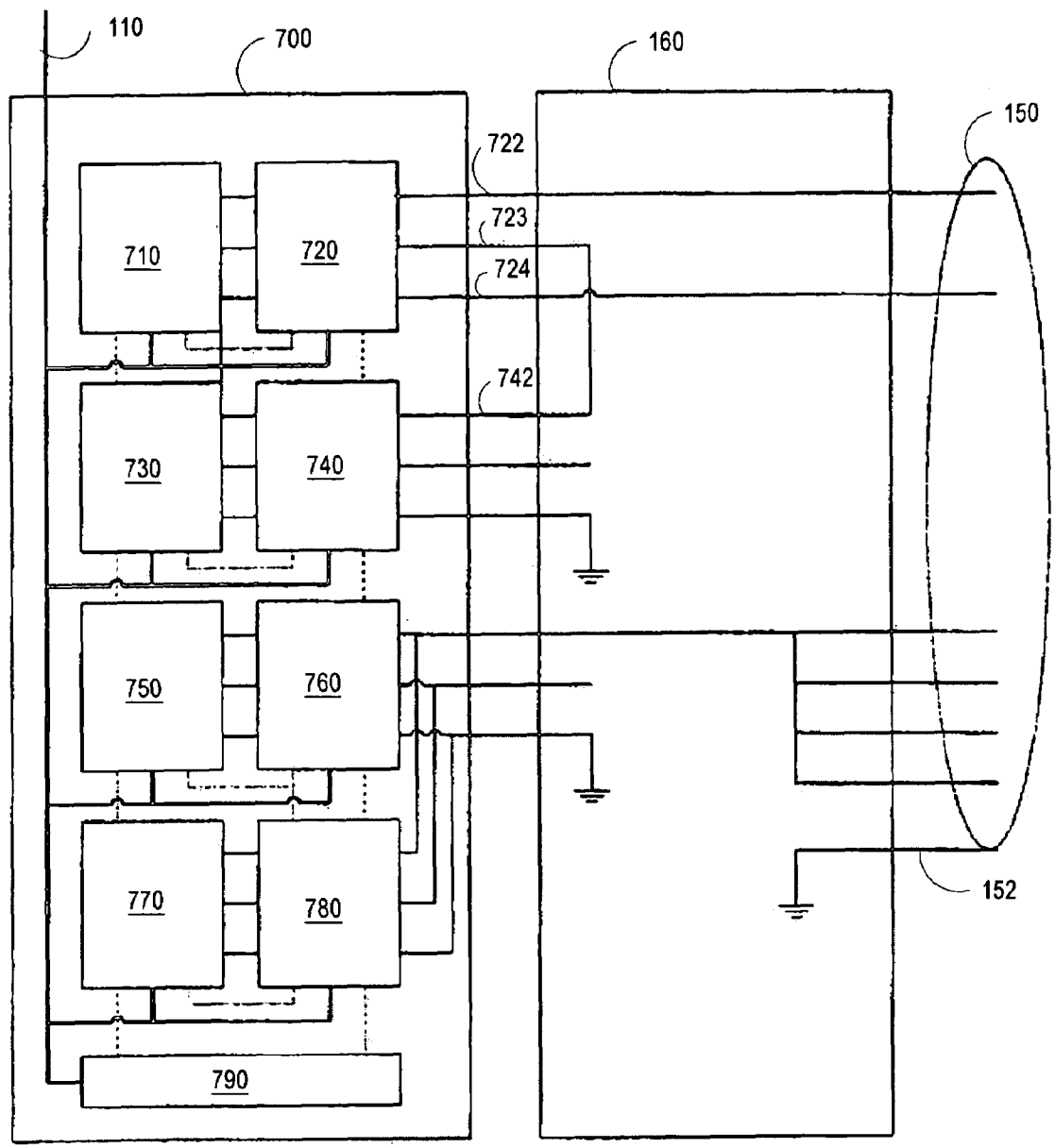
FIG. 7 is a block diagram of a wireline power system for providing power to a wireline logging system, according to one embodiment of the invention.

FIG. 7 is a block diagram of a wireline power system 700 for providing power to a wireline logging system, according to one embodiment of the invention. The wireline power system 700 includes multiple units of the universal power module 200. Shown are units 710, 720, 730, 740, 750, 760, 770, and 780, and a system control unit 790 being connected in a power sharing arrangement. Each of the units 710, 720, 730, 740, 750, 760, 770, 780 included in the wireline power system 700 is substantially similar in terms of structure and functionality of the universal power module 200.

In one embodiment, the wireline power system 700 is operable to generate N types of the output power signal 235. In the depicted embodiment, N=3, and the 3 types of output power signals are: 1) floating point high voltage AC signal provided by units 710 and 720, 2) center tap high voltage DC signal provided by units 730 and 740 and 3) high current DC signal provided by units 750, 760, 770 and 780. In this embodiment, the output power signal 235 is selectively one of the above 3 types of output power signals.

Universal power modules having a substantially similar output power signal are grouped together in a power sharing arrangement. To implement the 3 types of power the wireline power supply 700 will require at least 3 substantially similar units of the universal power module 200. For example, in one embodiment, unit 710 may be configured to provide the floating point high voltage AC signal, unit 730 may be configured to provide center tap high voltage DC signal, and unit 750 may be configured to provide the high current DC signal. Since each unit has a finite power handling capacity, additional units may be required depending on the power and current requirement of the logging application. Redundancy requirements may also result in additional units.

In the depicted embodiment, modules 710 and 720 are connected in parallel to generate the predefined floating high voltage AC power signal across terminals 722 and 724 with redundancy in case of failure of one module. Terminal 723 provides a center tap for unit 720. In this embodiment, units 730 and 740 are connected in parallel to generate the predefined high voltage DC signal at terminal 742, which is coupled to the center tap terminal 723 of units 710 and 720. The higher voltage DC signal is available either at terminal 722 or 724 relative to the center tap. In this embodiment, the total current required by the logging device (not shown) may not be able to be provided by any one of the units 750, 760, 770 or 780. However, when units 750 and 760 and 770, 780 are connected in parallel the power sharing arrangement is able to share the total output current required by the logging device.

In one embodiment, the center tap terminal 723 of a first module (e.g., unit 710) or parallel combination of modules included in the plurality of universal power modules (e.g., units 710, 720, 730, 740, 750, 760, 770, and 780) is operable to receive an output of a second module or the parallel combination of modules to inject a common mode power signal on the output of the first module or the parallel combination of modules.

In the depicted embodiment, the system control unit 790, which is coupled to each of the units 710, 720, 730, 740, 750, 760, 770, and 780, is operable to control at least a portion of the power provided by each unit.

In the depicted embodiment, the wireline power system 700 is configured to provide N+1 redundancy. That is, the wireline power system 700 includes at least one redundant universal power module for every type of output power signal (720, 740 and 780, for example) operable to provide power when any one of the N number of the universal power modules becomes inoperable. For providing off-line redundancy the redundant universal power module may be carried as a spare part. When an on-line unit fails, the redundant universal power module may be configured to take the place of the failed unit. For providing on-line redundancy, the redundant universal power module may be configured to be operable within the group in a load sharing arrangement. For example, units 710, 720 are configured to provide one out of two redundancy. Under normal operating condition, units 710 and 720 may be configured for equal load sharing. Each of the units 710 and 720 are rated to provide full power to the load. Thus, in the event one of the units 710 or 720 fail, then the operating unit may be operable to provide full power to the load. As another example, units 750, 760, 770 and 780 are configured to provide 3 out of four redundancy. Under normal operating condition, units 750, 760, 770 and 780 may be configured for equal load sharing, with the combination of any 3 of the units 750, 760, 770 and 780 being rated to provide full power to the load. Thus, in the event one of the units 750, 760, 770 or 780 fail, then the operating units may be operable to provide the total power to the load.

Figure 8:
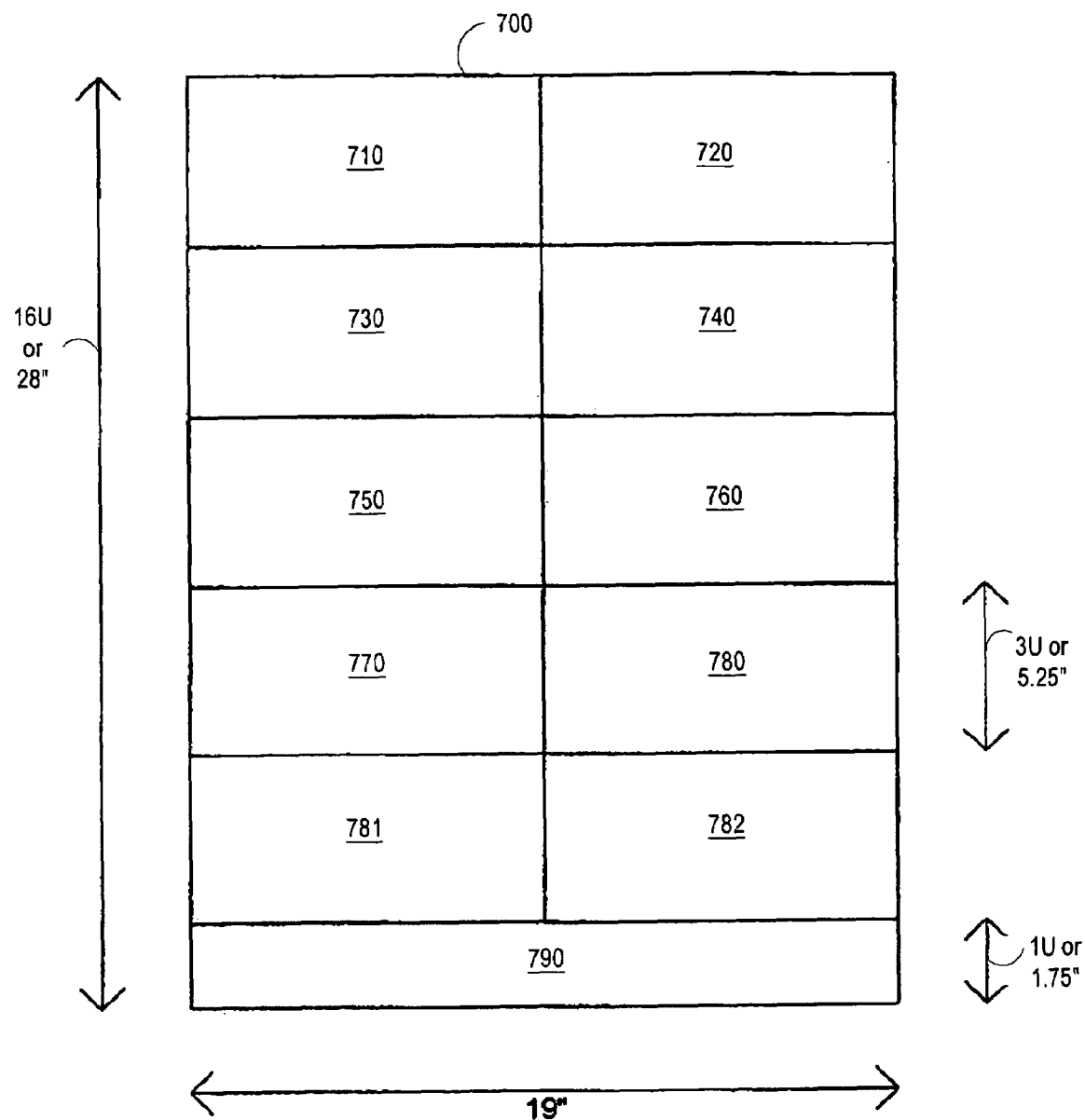
FIG. 8 is an illustrative cabinet layout arrangement to install the wireline power system illustrated in FIG. 7, according to one embodiment of the invention.

FIG. 8 is an illustrative cabinet layout arrangement to install the wireline power system 700 illustrated in FIG. 7, according to one embodiment of the invention. The wireline power system 700 is installed in a portion of a cabinet with 19" EIA rack mount standard width. In the depicted embodiment, each of the units 710, 720, 730, 740, 750, 760, 770, and 780 has a height of 3 U or approximately 5.25". The system control unit 790 has a height of 1 U or approximately 1.75". The wireline power system 700 includes 2 spare slots 781 and 782 for additional units. The overall height of the wireline power system 700 is 16 U. Most cabinets have a height, which varies from 83" to 90" and a depth, which varies from 30" to 40".

In an alternative embodiment, the cabinet will include eight power modules plus the control unit 790. The arrangement is two 6 U rows of 4 modules, each 4.25" wide for a total height of 12 U plus the control unit 790 of 1 U. In yet another alternative embodiment, a cabinet arrangement includes 8 modules 19" wide, 1.5 U high for a total of 12 U plus the control unit 790 of 1 U.

Figure 9:
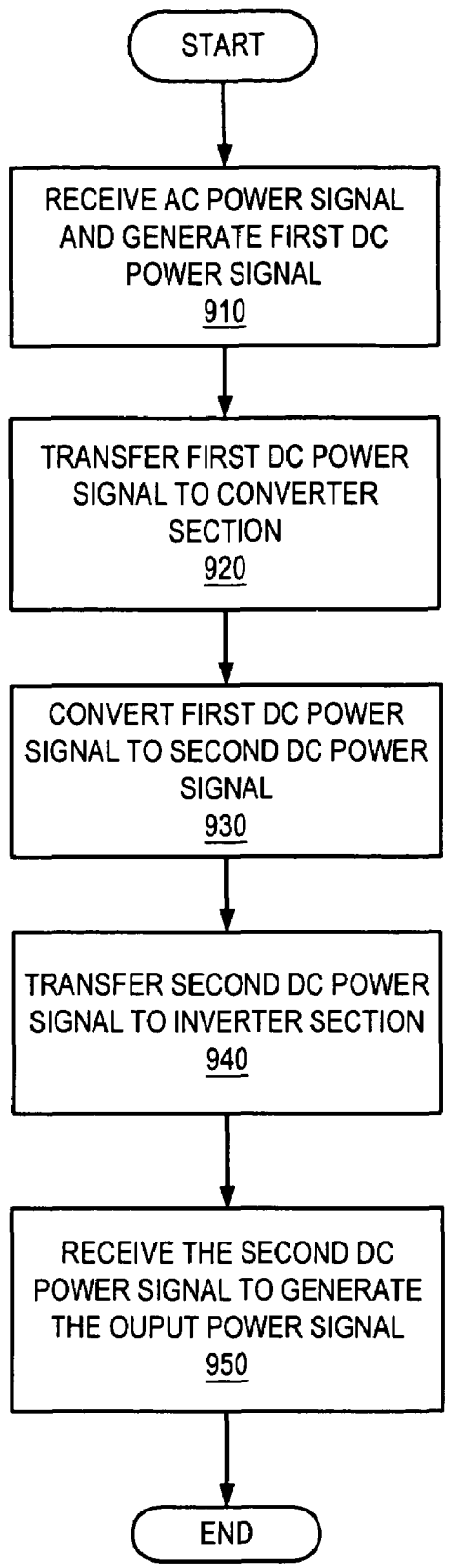
FIG. 9 illustrates a flow diagram of a method for providing power to a wireline logging system in accordance with an embodiment of the present invention.

Referring to FIG. 9, a flow diagram of a method for providing power to a wireline logging system is illustrated, according to one embodiment. In step 910, the AC power signal 110 is received as an input by the rectifier section 210 to generate the first DC power signal 215. In step 920, the first DC power signal 215 is transferred to the converter section 220 cascadedly coupled to the rectifier section 210. In step 930, the converter section 220 converts the first DC power signal 215 to the second DC power signal 225 floating versus signal 215 and ground. In step 940, the second DC power signal 225 is transferred to the inverter section 230 cascadedly coupled to the converter section 220. In step 950, the inverter section 230 receives the second DC power signal 225 to generate the output power signal 235.

The generation of the first DC power signal 215, the second DC power signal 225 and the output power signal 235 in steps 910, 930 and 950 respectively is controlled by the control section 240 in response to the control section 240 receiving information describing waveforms for the output power signal 235. The output power signal 235 provides the power to at least one logging device (not shown) included in the wireline logging system 700. Various steps described above may be added, omitted, combined, altered, or performed in different orders.

The description of the present embodiment has been presented for purposes of illustration, but is not intended to be exhaustive or to limit the invention to the form disclosed.

Many modifications and variations will be apparent to those of ordinary skill in the art. To reiterate, the embodiments were chosen and described in order to best explain the principles of the invention, the practical application, and to enable others of ordinary skill in the art to understand the invention.

Various other embodiments having various modifications may be suited to a particular use contemplated, but may be within the scope of the present invention. For example, those of ordinary skill in the art will appreciate that the tools and methods illustrated herein may vary depending on the implementation.

To reiterate, many additional aspects, modifications and variations are also contemplated and are intended to be encompassed within the scope of the following claims. Moreover, it should be understood that in the following claims, actions are not necessarily performed in the particular sequence in which they are set out.

What is claimed is:

1. A universal power module for providing power to a wireline logging system, the module comprising:
    a rectifier section operable to receive an alternating current (AC) input signal and generate a first direct current (DC) power signal as an output;
    a converter section cascadedly coupled to the rectifier section, the converter section converting the first DC power signal to a second DC power signal wherein the second DC power signal is floated with respect to the first DC power signal and a ground;
    an inverter section cascadedly coupled to the converter section, the inverter section being operable to generate an output power signal in response to receiving the second DC power signal;
    a control section coupled to the rectifier section, the converter section, the inverter section and a communications link, wherein the communications link is operable to receive information describing waveforms for the output power signal, wherein the control section is operable to receive the information and control a corresponding section to generate the waveforms in response to receiving the information; and
    wherein the output power signal is suitable for powering at least one logging device included in the wireline logging system.

2. The module of claim 1, wherein the output power signal is selectively a) the second DC power signal, b) the second DC power signal having a reverse polarity, or c) an AC output signal.

3. The module of claim 1, wherein the information includes definitions for an amplitude, frequency, and duty cycle for the output power signal or definitions for a voltage level of the first and second DC power signals.

4. The module of claim 1, wherein the inverter section includes first, second, and third output terminals for electrically coupling the output power signal to the at least one logging device, wherein the first and third output terminals provide a floating point output and the second output terminal provides a center tap.

5. The module of claim 4, wherein the center tap is coupled a voltage output to inject a common mode power signal on the first and third output terminals.

6. The module of claim 1, further comprising a plurality of additional universal power modules coupled in a power sharing arrangement to form a wireline power system, wherein each universal power module is operable to provide at least a portion of the power required by the wireline logging system.

7. The module of claim 6, wherein the wireline power system includes at least two of the universal power modules coupled in parallel to combine their respective individual currents, the combined currents being sufficient to operate the at least one logging device.

8. The module of claim 6, wherein the wireline power system includes a system control unit operable to control each of the respective control sections of the plurality of the universal power modules, wherein the portion of the power provided by each universal power module is defined by the system control unit.

9. The module of claim 6, wherein the wireline power system includes at least one redundant universal power module, wherein the redundant universal power module is operable when any one of the plurality of the universal power modules becomes inoperable.

10. The module of claim 1, wherein the AC input signal is a three-phase AC signal and wherein the rectifier section includes a three-phase rectifier section having a passive power factor correction (PFC) section as an input.

11. The module of claim 1, wherein the AC input signal is a three-phase AC signal and wherein the rectifier section includes a three-phase rectifier section having an active power factor correction (PFC) section as an input.

12. The module of claim 1, wherein the AC input signal is a single-phase AC signal and wherein the rectifier section includes a single-phase rectifier section having an active power factor correction (PFC) section or a passive PFC section as an input.

13. The module of claim 1, wherein the rectifier section is adapted to receive the AC input signal and wherein the AC input signal conforms to at least one power distribution standard published by The International Electrotechnical Commission (IEC).

14. The module of claim 1, wherein the converter section is operable to boost the second DC power signal to a predetermined voltage level and wherein the predetermined voltage level is sufficient to operate the at least one logging device.

15. The module of claim 1, wherein the inverter section is operable to be statically switched as directed by the control section.

16. A method of providing power to a wireline logging system, the method comprising:
receiving an alternating current (AC) input signal to generate a first direct current (DC) power signal, the first DC power signal being generated by a rectifier section responsive to the receiving of the AC input signal;
transferring the first DC power signal to a converter section cascadedly coupled to the rectifier section;
converting the first DC power signal to a second DC power signal thereby causing the second DC power signal to be floated with respect to the first DC power signal and a ground, the second DC power signal being converted from the first DC power signal by the converter section;
transferring the second DC power signal to an inverter section cascadedly coupled to the converter section;
generating an output power signal responsive to the inverter section receiving the second DC power signal; and
wherein a control section is operable to receive information describing waveforms for the output power signal, wherein the control section is operable to direct the rectifier section, the converter section and the inverter section to generate the waveforms, wherein the output power signal provides the power to at least one logging device included in the wireline logging system.

17. The method of claim 16, wherein the output power signal is selectively a) the second DC power signal, b) the second DC power signal having a reverse polarity, or c) an AC output signal.

18. The method of claim 16, wherein the information is generated by a software program included in a computer system coupled to the communications link, wherein the information includes definitions for an amplitude and a frequency for the output power signal or definitions for a voltage level of the first and second DC power signals.

19. The method of claim 16, wherein the inverter section includes a first, second and third output terminals for electrically coupling the output power signals to the at least one logging device, wherein the first and third output terminals provide a floating point output and the second output terminal provides a center tap.

20. The method of claim 19, wherein the center tap is coupled to a voltage output to inject a common mode power signal on the first and third output terminals.

21. The method of claim 16, comprising:
coupling a plurality of the universal power modules in a power sharing arrangement to form a wireline power system, wherein each universal power module is operable to provide at least a portion of the power required by the wireline logging system.

22. The method of claim 21, wherein the wireline power system includes the plurality of the universal power modules being coupled in parallel to combine individual currents generated by each universal power module, the combined currents being sufficient to operate the at least one logging device.

23. The method of claim 21, wherein the wireline power system includes the plurality of the universal power modules being coupled in series to combine individual voltages generated by each universal power module, the combined voltages being sufficient to operate the at least one logging device.

24. The method of claim 21, wherein the wireline power system includes at least one redundant universal power module, wherein the redundant universal power module is operable when any one of the plurality of the universal power modules becomes inoperable.

25. The method of claim 16, wherein the AC input signal is a three-phase AC signal, wherein the rectifier section includes a three-phase rectifier section having a passive power factor correction (PFC) section as an input.

26. The method of claim 16, wherein the AC input signal is a three-phase AC signal, wherein the rectifier section includes a three-phase rectifier section having an active power factor correction (PFC) section as an input.

27. The method of claim 16, wherein the AC input signal is a single-phase AC signal, wherein the rectifier section includes a single-phase rectifier section having an active power factor correction (PFC) section or a passive PFC section as an input.

28. The method of claim 16, wherein the rectifier section is adapted to receive the AC input signal, wherein the AC input signal conforms to at least one power distribution standard published by The International Electrotechnical Commission (IEC).

29. The method of claim 16, wherein the converter section is operable to boost the second DC power signal to a predetermined voltage level, wherein the predetermined voltage level is sufficient to operate the at least one logging device.

30. The method of claim 16, wherein the inverter section is operable to be statically switched as directed by the control section.

31. A wireline power system for providing power to a wireline logging system, the system comprising:
 a plurality of universal power modules, wherein each of the universal power modules are substantially similar, wherein each of the universal power modules is operable to receive an alternating current (AC) input signal and generate an output power signal having a defined waveform, wherein at least a portion of the universal power modules having a substantially similar output power signal are coupled to form a power sharing arrangement; and
 a system control unit coupled to each of the universal power modules, wherein the system control unit is operable to control at least a portion of the power provided by each universal power module included in the power sharing arrangement.

32. The system of claim 31, wherein each of the universal power modules comprises:
 a rectifier section operable to receive the AC input signal and generate a first direct current (DC) power signal as an output;
 a converter section cascadedly coupled to the rectifier section, the converter section converting the first DC power signal to a second DC power signal thereby causing the second DC power signal to be floated with respect to the first DC power signal and a ground;
 an inverter section cascadedly coupled to the converter section, the inverter section being operable to generate the output power signal in response to receiving the second DC power signal; and
 a control section coupled to the rectifier section, the converter section, the inverter section and a communications link, wherein the communications link is operable to receive information describing waveforms for the output power signal, wherein the control section is operable to receive the information and control a corresponding section to generate the waveforms in response to receiving the information.

33. The system of claim 31, wherein the output power signal is selectively one of an N number of the substantially similar output power signals.

34. The system of claim 33, wherein the number of the power sharing arrangements formed is equal to N.

35. The system of claim 33, wherein the plurality of the universal power modules are at least equal to the N number.

36. The system of claim 31, wherein the plurality of the universal power modules are coupled in parallel to combine individual currents generated by each universal power module, the combined currents being sufficient to operate at least one logging device of the wireline logging system.

37. The system of claim 31, wherein a center tap of a first module or parallel combination of modules included in the plurality of universal power modules is operable to receive an output of a second module or the parallel combination of modules to inject a common mode power signal on the output of the first module or the parallel combination of modules.

38. The system of claim 31, wherein the wireline power system includes at least one redundant universal power module, wherein the redundant universal power module is operable when any one of the plurality of the universal power modules becomes inoperable.

* * * * *